No. 802,354. PATENTED OCT. 17, 1905.
C. ELLIS.
PROCESS OF SLAKING LIME AND LIME CONTAINING SUBSTANCES
AND CERTAIN NOVEL PRODUCTS OF SAID PROCESS.
APPLICATION FILED JULY 18, 1905.
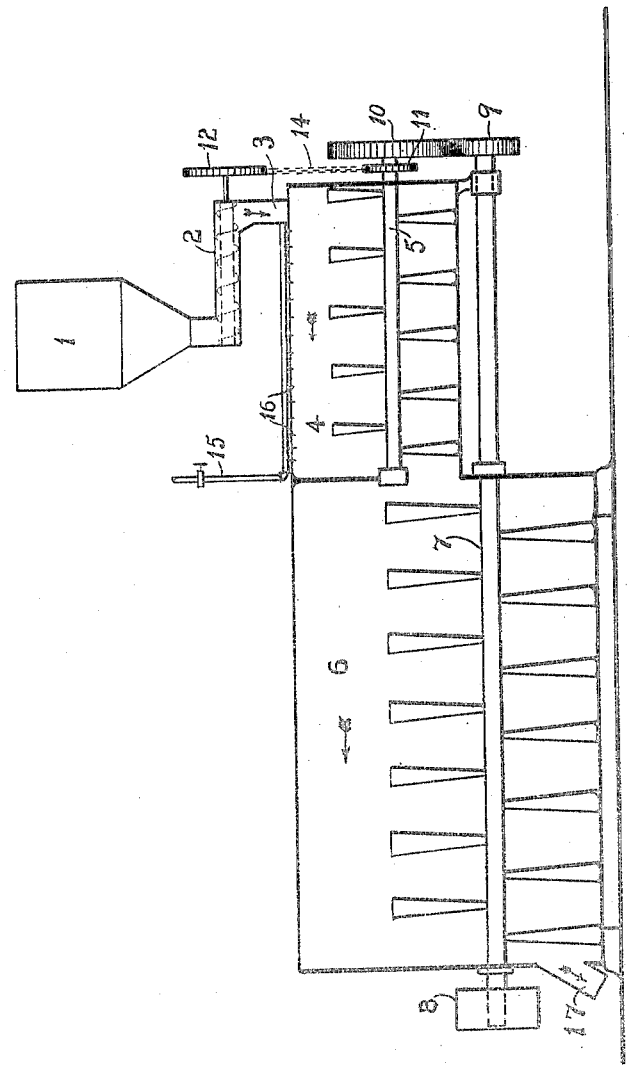

UNITED STATES PATENT OFFICE.

CARLETON ELLIS, OF NEW YORK, N. Y.

PROCESS OF SLAKING LIME AND LIME-CONTAINING SUBSTANCES AND CERTAIN NOVEL PRODUCTS OF SAID PROCESS.

No. 802,354.      Specification of Letters Patent.      Patented Oct. 17, 1905.

Application filed July 18, 1905. Serial No. 270,193.

*To all whom it may concern:*

Be it known that I, CARLETON ELLIS, a citizen of the United States, residing in the city, county, and State of New York, have invented certain new and useful Improvements in Processes of Slaking Lime and Lime-Containing Substances, also Certain Novel Products of said Process; and I do hereby declare the following to be a full, clear, and exact description of said process and products.

This invention relates to processes of slaking lime and lime-containing substances and to the products thereof.

It consists in a novel continuous process of slaking lime to a dry uniform powder of regulated hydration complete or incomplete to any degree which may be desired; and the said invention also consists in certain novel products obtained by such incomplete hydration.

The desirability of being able to slake lime uniformly and rapidly and to a dry powder is well recognized; but the methods heretofore known for accomplishing this end have been unsatisfactory, involving either slow, tedious, and expensive manual labor, or in the case of the many mechanical processes being incapable of yielding a uniform product such as is necessary for good work. These difficulties and objections are obviated, however, by my invention, which comprises a continuous process of hydration capable of being conducted by machinery and of reducing the lime or lime-containing substances to a dry powder which is hydrated completely or to any desired percentage of incomplete hydration.

In another application for Letters Patent filed July 13, 1903, Serial No. 165,363, I have claimed a process of hydrating lime completely, said process consisting in bringing together a stream of lime and a stream of water, the latter just sufficient in quantity to completely hydrate the lime, and then allowing the combined stream to flow on beyond the point of addition of the water while the hydration continues. In the present application I claim a process of incompletely hydrating lime and also claim generically the invention common to this and to said prior application.

For many purposes a dry but completely-hydrated lime is very desirable. It may be transported without the many difficulties and dangers incident to the transportation of quicklime, is ready for immediate mixture with water and sand or other materials to make mortar, cement, &c., and when so mixed does not occasion the production of heat, which is so annoying when quicklime is slaked, nor is there the delay due to waiting for the slaking to go on—a matter of hours or days in some cases. It also permits the production as an article of manufacture of dry-mixed mortar—that is, a dry mixture of lime, sand, &c.—which is ready for use upon the addition of moisture, and the mixing of the dry hydrated lime with the sand, &c., involves much less work than the mixing of the same ingredients when wet and may be done with great thoroughness. For many purposes also it is desirable to use an incompletely-hydrated lime—that is, lime which has been slaked to a point more or less short of complete saturation of its chemical affinity for water. This is the case in making mixtures of lime and cement, whether the latter be of the Portland, natural, slag, or other varieties. Completely-hydrated lime, even when in the form of a dry powder, usually contains or absorbs from the atmosphere an excess of moisture. If attempt be made, therefore, to mix such completely-hydrated lime with cement and to retain it in such mixed condition for any considerable length of time, (as is unavoidable if such mixture is to be treated as an article of manufacture or an article of commerce,) there is danger that the cement will take up the excess of moisture from the lime and set. This difficulty is avoided by the use, instead of completly-hydrated lime, of partly-hydrated or "short-slaked" lime, the hydration of which is sufficiently incomplete to insure that there shall be no excess of water present either at the time of mixing or subsequently for an extended period as a result of absorption from the air. As will be shown hereinafter, however, this short-slaked lime, though incompletely hydrated, has had its chemical affinity for water so nearly satisfied that it may be handled with substantially the same ease as completely-hydrated lime and with the same absence of the difficulties, dangers, and inconveniences attendant upon the handling of quicklime. The short-slaked lime does not heat objectionably upon the addition of water, but when water is added slakes to complete hydration very quickly.

The use of short-slaked lime has the further advantage over the common practice in the making of mortar, &c., of slaking quicklime completely and then adding the other ingredients to it, that on the addition of water the lime, particularly if it be "fat," tends to become a smeary putty, which quality impedes thorough mixing and distribution of the ingredients. "Lean" limes, on the other hand, if used in the ordinary way just referred to in the making of cement mortars, &c., are apt to take up moisture with less speed than the cement itself, slaking after setting has begun and causing the cement to fail. By using the short-slaked lime of the present invention—that is to say, a lime slaked to approximately three-fourths to four-fifths of complete hydration—a cement mortar of much improved quality may be obtained and much better results as to impermeability to moisture realized. Moreover, the cement mortar formed of the short-slaked lime works easier and better.

In making lime mortars for plastic purposes, and particularly when using magnesian lime, I have found that the partially-hydrated lime works better under the trowel than completely-prehydrated lime, which latter does not soften up well with water and forms a mortar which sticks to the trowel, preventing dressing to a smooth surface. This difficulty is not experienced with mortars made from the partially-hydrated or short-slaked limes of the present invention. The short-slaked lime also forms a better ingredient of calcined or "hard-wall" plaster mixtures for similar reasons and also because the short-slaked lime does not give up moisture to the plaster. For this reason the short-slaked lime makes practicable as an article of manufacture a ready-mixed plaster composition requiring only the addition of water to fit it for use.

The incomplete hydration, to a regulated degree, of lime also forms a convenient and valuable means of regulating the action of lime as a caustic, for which reason lime partly hydrated in accordance with my invention may be used in depilatories, paint-removers, &c.

It is of course obvious that in the partially-hydrated limes the hydration, to whatever extent it may be carried, must be uniform throughout the mass in order that uniform results may be obtained by the user, also that the extent of the hydration must be perfectly under the control of the operator and variable at will in order to enable him to obtain products specially suited for different purposes and to make it possible to furnish the same grade at all times, whatever the raw lime used.

The objects of my invention, therefore, are to hydrate lime in a simple, easy, and economical manner; to keep the degree of hydration completely under control and permit variation of such degree of hydration to any extent desired; to insure that the hydration, whether partial or complete, shall be uniform throughout the mass treated; to make the process of hydration a continuous one, capable of being carried out by automatic machinery; to produce superior ready-mixed cements and plasters, and to produce as an article of manufacture a dry, powdered, short-slaked lime hydrated to such degree that it may be handled and transported with the same facility as completely-slaked lime and may be used with the same facility and without the objections and inconveniences which attend the use of quicklime and which will give results superior in many cases to those obtainable from completely-hydrated lime and equal in all respects to those obtainable from quicklime.

In carrying out my process I cause the lime, which preferably is in small fragments or in a pulverulent state, to move in a stream or continuous body through and beyond a zone of water-supply wherein water flows into the lime in an amount regulated to produce the precise degree of hydration desired, whether partial or complete. The water is all added before any substantial hydration takes place, that it may penetrate throughout the mass of lime before the pores of the latter are sealed by hydration of the exterior; but I do not mean by this that the water must all be added in a single stream. To the contrary, the addition of the water may continue through a considerable zone or space traversed by the moving stream or mass of lime, hydration not taking place, at least to a material extent, until the lapse of a certain time after the first addition of the water; but it is essential that the water necessary for the production of the desired degree of hydration shall all be added and distributed well through the mass before the pores are sealed by hydration, as otherwise irregular results may be obtained. After the lime passes from the zone in which the addition of water occurs the motion of the stream or body of lime is continued while hydration goes on, the conduit in which this action occurs being preferably a closed one, so that little or none of the moisture is lost by evaporation, the hydration taking place in the vapor produced by such hydration. During the process of hydration the mass of lime is preferably stirred, agitated, mixed, or worked by suitable means. The hydration continues, as above described, until all free water has disappeared and the union of the water with the lime is complete, as a result of which action the lime will have been reduced to a dry powder, which latter is then discharged from the conduit in which the hydration has been conducted. The amount of water added will be regulated according to the quality of the lime treated and according to the degree of hydration desired, all as dictated by experience. As is well known, fat lime requires for complete hydration only about one-third of its weight of water, although in practice about half its weight is customarily added, the excess compensating for loss by evaporation; but each particular brand of lime requires a slightly different amount of water in correspondence with its composition, few limes being pure calcium oxid and most limes containing magnesia in greater or less amount. In each case, therefore, the volume of water added must be regulated by experience and by the observed composition of the finished slaked product.

The water used may be heated, particularly when lean limes are treated, as the heating of the water accelerates the action. The operation being conducted in a closed conduit, the heat produced by the reaction is retained, and the progress of the operation thereby greatly facilitated. The use of a closed conduit also prevents dissipation of lime-dust and keeps the carbon dioxid of the air from contaminating the lime.

Portland and other cements and the hydraulic limes into which they grade usually contain more or less free lime which requires to be slaked, as universally recognized, since being usually of the slow-slaking varieties if allowed to remain unslaked until the cement is used it does not hydrate at once when the cement is mixed with water, but continues to absorb water for lengthy periods of time, slaking completely only after the cement proper has set and by its swelling causing the concrete, &c., to fail or weaken, according to its amount. The usual method of slaking the free lime in cement and the like is either to allow the cement to weather by exposure to the air or by treating it in mechanical devices, whereby moistened air is forced to permeate it. Both of these methods are unsatisfactory. By treating limy cements and the like by my process, as above described, and preferably by adding the water in the form of a dust-spray, the hydration of the contained lime may be effected quickly and thoroughly. I intend in the following claims to include the hydration of lime as such and also when intermixed with or combined with other substances—such as cement, for example.

For the production as an article of manufacture or article of commerce of a short-slaked lime I have found hydration to from three-fourths to four-fifths of complete hydration desirable. The product thus formed is a dry powder which may be stored in barrels, bags, &c., without suffering deterioration by moisture from the air for long periods of time, which may be handled with facility, and which does not liberate heat objectionably when moistened, but nevertheless softens readily when moistened, and is thus suitable for use as an ingredient of high-grade plasters, mortars, cements, and the like.

Ready-mixed plasters, cements, mortars, &c., may be formed by mixing short-slaked lime slaked to the degree above specified or to other degrees, as found desirable, and mixed dry with plaster, cement, sand, &c., and these dry mixtures will remain dry and in condition for use for long periods of time, because of the power of the short-slaked lime of absorbing moisture which might otherwise impair the quality of the plaster, cement, &c., and because the short-slaked lime contains no excess of moisture, as full-slaked lime often does, which excess of moisture may be imparted to the plaster or cement and cause premature setting thereof.

While I do not confine myself to the use of any particular apparatus for carrying out my process, I have illustrated diagramatically in the accompany drawing one form of apparatus for carrying out said process.

In said drawing, 1 designates a hopper from which the lime is fed to the hydrating apparatus by means of a suitable feeding device 2, indicated in the drawing as a screw working in a trough. From said trough the lime falls through a chute 3 into a trough 4, along which it is moved by suitable propelling means, such as a screw 5, and in this conduit it receives the water for hydration, which water is delivered from a source of supply (not shown) by pipe 15, having a plurality of jet-nozzles or spraying devices 16. The number and distribution of these spraying devices 16 is such that the water required for hydration is all delivered to the lime in the conduit 4 before hydration has taken place to any material extent, the screw 5 serving to distribute the moisture through the mass of lime by stirring the latter, as well as moving it through the conduit. From conduit 4 the moistened lime falls into the closed conduit 6, in which the hydration goes on, the mass of lime being stirred and moved onward slowly by suitable means, such as the conveyer 7. The conduit being closed, the vapor produced by the hydration is retained, as is the lime-dust produced, and the air is excluded. In this way loss by evaporation is avoided, thereby avoiding variation in degree of hydration due to variable loss of moisture by evaporation, while the exclusion of air prevents the entrance of carbonic-acid gas. A very uniform and pure product is thereby insured. The amount of water supplied is completely under control by means of a valve in pipe 8 or other suitable means, and by regulating the flow of water and, if necessary, by varying the speed of drive of the various conveyers employed the degree of hydration of the lime may be varied as desired and regulated with great nicety.

In the drawing I have indicated means for driving the various conveyers, comprising a belt-wheel 8 on the shaft of conveyer 7, gears 9 and 10, communicating motion from conveyer 7 to conveyer 5, and sprocket-gears 11 and 12 and a drive-chain 14, communicating motion from conveyer 5 to conveyer 2; but obviously many different ways of driving the several conveyers may be devised.

17 designates the outlet for the completely-hydrated lime. The lime discharged there-from, which will be completely or partially hydrated, according to the amount of water added, may then be put up in packages or mixed with plaster, cement, sand, &c., for the making of ready-mixed plaster, mortar, and the like, or may be utilized or disposed of otherwise.

Cement and other substances requiring hydration may be treated in the same manner, except that the water is preferably added to limy cements in the form of a dust-spray, pipe 15 being provided with suitable devices for producing this character of spray.

I intend the term "cementitious material" where used in the following claims to be generic both to cements proper and to plasters and other water-setting plastics.

What I claim is—

1. The process of slaking quicklime to a dry condition which consists in moving a body of such lime through and beyond a zone of water-supply before hydration to a material extent takes place in such body, supplying water to the lime while in said zone in amount merely sufficient to slake it to the desired extent, and thereafter continuing the forward movement of the lime and simultaneously stirring it while hydration continues.

2. The process of slaking quicklime which consists in moving a body of such lime through and beyond a zone of water-supply before hydration to a material extent takes place in such body, supplying water to the lime while in said zone in amount insufficient to completely slake it, and thereafter continuing the forward movement of the lime and simultaneously stirring it while hydration continues.

3. The process of slaking quicklime which consists in moving a body of such lime through and beyond a zone of water-supply before hydration to a material extent takes place in such body, supplying water to the lime while in said zone in amount just sufficient to slake the major part of the lime, and thereafter continuing the forward movement of the lime and simultaneously stirring it while hydration continues.

4. The process of slaking quicklime which consists in moving a body of such lime through and beyond a zone of water-supply before hydration to a material extent takes place in such body, supplying water to the lime while in said zone in amount sufficient to slake in excess of sixty per cent. of the lime but insufficient to slake the latter completely, and thereafter continuing the forward movement of the lime and simultaneously stirring while hydration continues.

5. The process of slaking quicklime which consists in moving a body of such lime through and beyond a zone of water-supply before hydration to a material extent takes place in such body, supplying water to the lime while in said zone in amount merely sufficient to slake it between approximately three-fourths to four-fifths of complete hydration, and thereafter continuing the forward movement of the lime and simultaneously stirring it while hydration continues.

6. As an article of manufacture, a dry short-slaked lime, comprising lime uniformly slaked to in excess of sixty per cent. of complete hydration, but not completely slaked.

7. As an article of manufacture, a dry short-slaked lime, comprising lime uniformly slaked to between three-fourths and four-fifths, approximately, of complete hydration, but not completely slaked.

In testimony whereof I affix my signature in the presence of two witnesses.

CARLETON ELLIS.

Witnesses:
HARRY M. MARBLE,
D. HOWARD HAYWOOD.